United States Patent
Jiang et al.

(10) Patent No.: US 11,187,554 B2
(45) Date of Patent: Nov. 30, 2021

(54) METHOD, DEVICE AND COMPUTER STORAGE MEDIUM FOR PROVIDING RUNNING SPEED OF URBAN ROAD

(71) Applicant: BAIDU ONLINE NETWORK TECHNOLOGY (BEIJING) CO., LTD., Beijing (CN)

(72) Inventors: Chang Jiang, Beijing (CN); Wentao Liu, Beijing (CN); Hao Wang, Beijing (CN); Zhaojie Su, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 309 days.

(21) Appl. No.: 16/348,952

(22) PCT Filed: Mar. 24, 2017

(86) PCT No.: PCT/CN2017/078119
§ 371 (c)(1),
(2) Date: May 10, 2019

(87) PCT Pub. No.: WO2018/107611
PCT Pub. Date: Jun. 21, 2018

(65) Prior Publication Data
US 2019/0271562 A1   Sep. 5, 2019

(30) Foreign Application Priority Data
Dec. 12, 2016  (CN) .......................... 201611140103.3

(51) Int. Cl.
*G01C 21/36* (2006.01)
*G01P 3/00* (2006.01)
*G08G 1/01* (2006.01)

(52) U.S. Cl.
CPC ............ *G01C 21/3697* (2013.01); *G01P 3/00* (2013.01); *G08G 1/0129* (2013.01); *G08G 1/0133* (2013.01)

(58) Field of Classification Search
CPC ........ G01C 21/00; G01C 21/26; G01C 21/34; G01C 21/36; G01C 21/3697; G01P 3/00;
(Continued)

(56) References Cited

U.S. PATENT DOCUMENTS

| | | | | |
|---|---|---|---|---|
| 10,248,120 | B1 * | 4/2019 | Siegel | G01C 21/3492 |
| | | | | 701/532 |
| 2002/0004704 | A1 * | 1/2002 | Nagatsuma | G01C 21/26 |
| | | | | 701/469 |

(Continued)

FOREIGN PATENT DOCUMENTS

| | | |
|---|---|---|
| CN | 101246021 A | 8/2008 |
| CN | 101266717 A | 9/2008 |

(Continued)

OTHER PUBLICATIONS

CN_103218768_Description_Machine Translation_English, translation provided by Espacenet—Patent Translate on May 17, 2021, pp. 1-12 (Year: 2013).*

(Continued)

*Primary Examiner* — Geepy Pe
*Assistant Examiner* — Michael Allen Brace, Jr.
(74) *Attorney, Agent, or Firm* — Lathrop GPM LLP

(57) ABSTRACT

A method, a device, and a storage medium for providing a running road of an urban road are provided in the present disclosure. The method includes: obtaining a weighed road length of a specified urban road according to user track data of the specified urban road and road network data of the specified urban road; obtaining an actual passing period of the specified urban road according to the road network data (Continued)

of the specified urban road and road condition data of the specified urban road; obtaining a running speed of the specified urban road according to the weighed road length of the specified urban road and the actual passing period of the specified urban road; and providing the running speed of the specified urban on digital map products.

15 Claims, 1 Drawing Sheet

(58) Field of Classification Search
CPC .......... G08G 1/00; G08G 1/01; G08G 1/0104; G08G 1/0125; G08G 1/0129; G08G 1/0133
See application file for complete search history.

(56) References Cited

U.S. PATENT DOCUMENTS

| | | | | |
|---|---|---|---|---|
| 2002/0070934 | A1* | 6/2002 | Sakamoto | G08G 1/0969 345/419 |
| 2003/0220735 | A1* | 11/2003 | Nimura | G09B 29/10 701/421 |
| 2005/0107946 | A1* | 5/2005 | Shimizu | G01C 21/28 701/408 |
| 2005/0143906 | A1* | 6/2005 | Ishikawa | G01C 21/3492 701/532 |
| 2005/0143908 | A1* | 6/2005 | Ishikawa | G01C 21/32 701/119 |
| 2007/0150185 | A1* | 6/2007 | Nagase | G01C 21/30 701/422 |
| 2007/0185643 | A1* | 8/2007 | Yamane | G08G 1/096775 701/117 |
| 2007/0229309 | A1* | 10/2007 | Tomita | G08G 1/096844 340/992 |
| 2008/0240506 | A1* | 10/2008 | Nakamura | G06K 9/2054 382/104 |
| 2009/0287410 | A1* | 11/2009 | Kobayashi | G01C 21/30 701/533 |
| 2011/0004397 | A1* | 1/2011 | Nagase | G08G 1/01 701/119 |
| 2011/0161261 | A1* | 6/2011 | Wu | G08G 1/0104 706/12 |
| 2013/0041642 | A1* | 2/2013 | Tsuburaya | G09B 29/10 701/421 |
| 2017/0350715 | A1* | 12/2017 | Tanizaki | G06K 9/2054 382/104 |

FOREIGN PATENT DOCUMENTS

| | | | |
|---|---|---|---|
| CN | 102128629 | A | 7/2011 |
| CN | 102521985 | A | 6/2012 |
| CN | 102592453 | A | 7/2012 |
| CN | 102819955 | A | 12/2012 |
| CN | 103218768 | A * | 7/2013 |
| CN | 104658252 | A | 5/2015 |
| CN | 104658272 | A | 5/2015 |
| CN | 104821080 | A | 8/2015 |
| JP | H10312497 | A | 11/1998 |
| JP | 2006244265 | A | 9/2006 |
| JP | 2008052756 | A | 3/2008 |
| WO | WO 2018021551 | A2 | 2/2008 |

OTHER PUBLICATIONS

Japanese Patent Application No. 2019-515300 Office Action dated Apr. 21, 2020, 3 pages.
Japanese Patent Application No. 2019-515300 English translation of Office Action dated Apr. 21, 2020, 3 pages.
Chinese Patent Application No. 201611140103.3 Office Action dated Nov. 5, 2018, 5 pages.
Chinese Patent Application No. 201611140103.3 English translation of Office Action dated Nov. 5, 2018, 5 pages.
PCT/CN2017/078119 English translation of International Search Report dated Aug. 30, 2017, 2 pages.
PCT/CN2017/078119 International Search Report and Written Opinion dated Aug. 30, 2017, 6 pages.
European Patent Application No. 17881969.4 extended Search and Opinion dated Jun. 19, 2020, 8 pages.
Chinese Patent Application No. 201611140103.3 Office Action dated Jul. 22, 2021, 7 pages.
Chinese Patent Application No. 201611140103.3 English translation of Office Action dated Jul. 22, 2021, 7 pages.

* cited by examiner

METHOD, DEVICE AND COMPUTER STORAGE MEDIUM FOR PROVIDING RUNNING SPEED OF URBAN ROAD

CROSS REFERENCE TO RELATED APPLICATION

This application is a U.S. national phase of international application No. PCT/CN2017/078119, filed on Mar. 24, 2017, which claims a priority to Chinese Patent Application No. 201611140103.3 filed on Dec. 12, 2016.

FIELD

The present disclosure relates to a field of traffic technologies, and more particularly to, a method, a device, and a storage medium for providing a running road of an urban road.

BACKGROUND

Traffic on urban roads is a system project. A running speed of an urban road is an important index reflecting the traffic on urban roads. Usually, a hardware device such as a video monitor device may be deployed at a specified position of the urban road, to obtain a running speed of certain area.

However, due to the high cost of deploying the hardware devices, the hardware devices may not be deployed on a large scale, such that a monitor result may not reflect urban road running conditions sometimes, causing that reliability for monitoring the urban road is reduced.

SUMMARY

An aspect of the present disclosure provides a method for providing a running speed of an urban road, which includes: obtaining a weighed road length of a specified urban road according to user track data of the specified urban road and road network data of the specified urban road; obtaining an actual passing period of the specified urban road according to the road network data of the specified urban road and road condition data of the specified urban road; obtaining a running speed of the specified urban road according to the weighed road length of the specified urban road and the actual passing period of the specified urban road; and providing the running speed of the specified urban on digital map products.

As the aspect described above and any possible implementation thereof, an implementation is further provided. Obtaining the weighed road length of the specified urban road according to the user track data of the specified urban road and the road network data of the specified urban road, includes: obtaining an amount of driving tracks of each link in the specified urban road according to the user track data of the specified urban road; obtaining a link length of each link and a number of lanes of each link according to the road network data of the specified urban road, and obtaining a link area of each link according to the link length of each link, the number of lanes of each link and a lane width of each link; obtaining a weighed road length of each link according to the amount of driving tracks of each link and the link area of each link; and obtaining the weighed road length of the specified urban road according to the weighed road length of each link.

As the aspect described above and any possible implementation thereof, an implementation is further provided. Obtaining the actual passing period of the specified urban road according to the road network data of the specified urban road and the road condition data of the specified urban road, includes: obtaining a link length of each link in the specified urban road according to the road network data of the specified urban road; obtaining an actual vehicle speed of each link in the specified urban road according to the road condition data of the specified urban road; obtaining a link passing period of each link according to the link length of each link and the actual vehicle speed of each link; and obtaining the actual passing period of the specified urban road according to the link passing period of each link.

As the aspect described above and any possible implementation thereof, an implementation is further provided. After obtaining the running speed of the specified urban road according to the weighed road length of the specified urban road and the actual passing period of the specified urban road, the method further includes: obtaining a smooth speed of the specified urban road; and obtaining a traffic index of the specified urban road according to the smooth speed of the specified urban road and the running speed of the specified urban road.

As the aspect described above and any possible implementation thereof, an implementation is further provided. Obtaining the smooth speed of the specified urban road includes: obtaining a minimum passing period of the specified urban road according to the road network data of the specified urban road and the road condition data of the specified urban road; and obtaining the smooth speed of the specified urban road according to the weighed road length of the specified urban road and the minimum passing period of the specified urban road.

possiblepossiblepossiblepossibleAnother aspect of the present disclosure provides a device, which includes: one or more processors; a memory; one or more programs, stored in the memory, when being executed by the one or more processors, configured to perform the following operations: obtaining a weighed road length of a specified urban road according to user track data of the specified urban road and road network data of the specified urban road; obtaining an actual passing period of the specified urban road according to the road network data of the specified urban road and road condition data of the specified urban road; obtaining a running speed of the specified urban road according to the weighed road length of the specified urban road and the actual passing period of the specified urban road; and providing the running speed of the specified urban road on the digital map products.

Another aspect of the present disclosure provides a non-volatile computer storage medium. The non-volatile computer readable storage medium has stored one or more programs thereon. When the one or more programs are executed by a device, the device performs the following operations: obtaining a weighed road length of a specified urban road according to user track data of the specified urban road and road network data of the specified urban road; obtaining an actual passing period of the specified urban road according to the road network data of the specified urban road and road condition data of the specified urban road; obtaining a running speed of the specified urban road according to the weighed road length of the specified urban road and the actual passing period of the specified urban road; and providing the running speed of the specified urban road on the digital map products.

BRIEF DESCRIPTION OF THE DRAWINGS

In order to more clearly illustrate the technical solutions in embodiments of the present disclosure, brief introduction will be made to accompanying drawings needing to be used in embodiments or the related art below. Obviously, the accompanying drawings in the description below are some embodiments of the present disclosure. For persons of ordinary skill in the art, other accompanying drawings may be obtained based on these accompanying drawings without any creative efforts.

DETAILED DESCRIPTION

In order to enable objectives, technical solutions and advantages of embodiments of the present disclosure more clearly, description will be made clearly and completely to the technical solutions in embodiments of the present disclosure below in conjunction with accompanying drawings in embodiments of the present disclosure. Apparently, embodiments described are part of embodiments of the present disclosure, not all the embodiments. Based on the embodiments of the present disclosure, all other embodiments obtained by persons of ordinary skill in the art without creative efforts shall fall within the protection scope of the present invention.

It should be noted that, a terminal involved in embodiments of the present disclosure may include but be not limited to a phone, a Personal Digital Assistant (PDA), a wireless handheld device, a table computer, a personal computer (PC), a MP3 (MPEG-1 Audio Layer III or MPEG-2 Audio Layer III) player, a MP4 (MPEG-4 Part 14) player, a wearable device (such as, smart glasses, a smart watch, a smart bracelet), etc.

In addition, terms "and/or" in the present disclosure are merely an associated relationship describing associated objects, representing that there may be three relationships. For example, A and/or B may represent three conditions that A exists separately, A and B exist at the same time, and B exists separately. In addition, the character "/" in the present disclosure generally represents that above and below associated objects are an "or" relationship.

Figure 1:
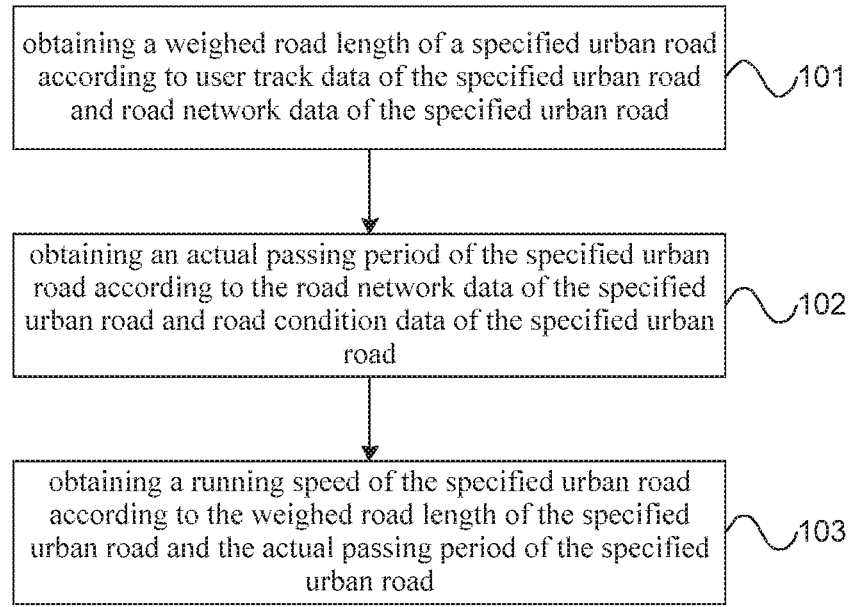
FIG. 1 is a flow chart illustrating a method for processing a running speed of an urban road provided in an embodiment of the present disclosure.

FIG. 1 is a flow chart illustrating a method for processing a running speed of an urban road provided in an embodiment of the present disclosure. As illustrated in FIG. 1, the method includes operations in the following blocks.

In block 101, a weighed road length of a specified urban road is obtained according to user track data of the specified urban road and road network data of the specified urban road.

In the present disclosure, a term "specified" involved in the specified urban road does not have a special meaning, which is merely for specifying a current operated object. Therefore, the specified urban road is a common urban road.

The user track data refers to data of historical tracks that the users have travelled. The historical track is a set including a plurality of track points. Usually, any method in the related art may be employed, to collect the user track data. For example, historical position data recorded by Global Positioning System in a terminal used by the user may be employed, to form the user historical track; or, for another example, a historical navigation result of the user may be directly used as the user historical track, which is not specially limited in embodiments.

The road network, i.e., an urban road network, refers to a network structure combined by roads of different functions, levels and locations with a certain density and an appropriate form in the scope of the city. A minimum unit of the road network is a link. Link_id may be used to represent each link, and corresponding link information is configured to describe the link. Link information corresponding to each link_id may usually include but be not limited to a link level such as a high-speed road, an express-speed road, a trunk road, a secondary trunk road and a branch road, a link length, a number of lanes and the like. The road network data refers to description information for describing the road network.

In block 102, an actual passing period of the specified urban road is obtained according to the road network data of the specified urban road and road condition data of the specified urban road.

The road condition data is configured to indicate a current passing speed of the urban road, that is, an actual vehicle speed. In detail, the road condition data may be directly obtained from Baidu Maps (Baidu Maps is a desktop and mobile web mapping service application and technology provided by Baidu), or real-time road condition data of the specified urban road may be collected by employing any collection way in the related art, which is not specially limited in embodiments.

For example, a collection way of a floating car may be employed, to obtain the real-time road condition data of the specified urban road. Such floating car may include but be not limited a vehicle such as a taxi, a coach and a logistics vehicle. The main force of obtaining the real-time road condition data is the taxi running in the urban area of the city.

In detail, Global Positioning System (GPS) terminals installed in these vehicles may transmit parameters obtained such as GPS data and running speeds to a processing center by a wireless communication network, and then the processing center, based on the parameters obtained, analyzes a road passing condition of a main traffic road as the real-time road condition data.

Or, as another example, a collection way of an image collection device may be employed, to obtain the real-time road condition data of the specified urban road.

In detail, the image collection device such as a camera may be provided in a specified position around the traffic road, such as a crossroad; or the image collection device such as the camera may be provided in the floating car, which is not specially limited in embodiments. Images collected by the image collection device are transmitted to the processing center, and then the processing center, based on images obtained, analyzes the road passing condition of the main traffic road of the city as the real-time road condition data.

It should be understood that, the operations in block 101 and block 102 may be executed without a fixed order. The operation in block 101 may be executed first, and then the operation in block 102 is executed; or, the operation in block 102 may be executed first, and then the operation in block 101 is executed; or the operation in block 101 and the operation in block 102 may be executed at the same time, which is not specially limited in embodiments.

In block 103, a running speed of the specified urban road is obtained according to the weighed road length of the specified urban road and the actual passing period of the specified urban road.

It should be noted that, part or all of execution objects of the operations in blocks 101-103 may be an application located in a native terminal, or may further be a function unit such as a plugin or a software development kit (SDK) provided in the application of the native terminal, or may further be a processing engine located in a network side server, or may further be a distributed system located in a network side, which is not specially limited in embodiments.

It should be understood that, the application may be a native App (application) installed in the terminal, or may further be a web App of a browser in the terminal, which is not limited in embodiments.

In this way, by obtaining the weighed road length of the specified urban road according to the user track data of the specified urban road and the road network data of the specified urban road, and obtaining the actual passing period of the specified urban road according to the road network data of the specified urban road and the road condition data of the specified urban road, the running speed of the specified urban road is obtained according to the weighed road length of the specified urban road and the actual passing period of the specified urban road. A weighted average speed of the specified urban road is obtained by employing the existing user track data, the existing road network data and the existing road condition data, to present the running speed, and there is no need to deploy any hardware device, which may avoid a technical problem that a monitor result may not completely reflect the running condition of the whole urban road due to high cost of deploying the hardware device in the related art, and improve the reliability for monitoring the urban road.

Alternatively, in a possible implementation of embodiments, in block 101, in detail, an amount of driving tracks of each link in the specified urban road is obtained according to the user track data of the specified urban road. The link, in the traffic field, refers to a traffic route between two neighboring nodes in the urban road network.

Then, a link length of each link and a number of lanes of each link in the specified urban road are obtained according to the road network data of the specified urban road, and furthermore a link area of each link is obtained according to the link length of each link, the number of lanes of each link and a lane width of each link. For example, the link area of each link=the link length of each link×the number of lanes of each link×the lane width of each link.

After, a weighed road length of each link is obtained according to the amount of driving tracks of each link and the link area of each link. For example, the weighed road length of each link=the amount of driving tracks of each link/the link area of each link.

Last, the weighed road length of the specified urban road is obtained according to the weighed road length of each link. For example, a sum of the weighed road lengths of links in the specified urban road may be taken as the weighed road length of the specified urban road, or a level of the link may further be taken as a weighed value, and the weighed road length of each link in the specified urban road is weighed based on the weighed value, and then a sum of weighed results is taken as the weighed road length of the specified urban road, or a product of the weighed road length of links in the specified urban road may further be taken as the weighed road length of the specified urban road, and the like, which is not specially limited in embodiments.

Alternatively, in a possible implementation of embodiments, in block 102, in detail, a link length of each link in the specified urban road is obtained according to the road network data of the specified urban road.

Then, an actual vehicle speed of each link in the specified urban road is obtained according to the road condition data of the specified urban road.

After, a link passing period of each link is obtained according to the link length of each link and the actual vehicle speed of each link, that is, the link passing period of each link=the link length of each link/the actual vehicle speed of each link.

Last, the actual passing period of the specified urban road is obtained according to the link passing period of each link. For example, a sum of the link passing periods of links in the specified urban road may be taken as the actual passing period of the specified urban road, or the level of the link may further be taken as the weighed value, and the link passing period of each link in the specified urban road is weighed based on the weighed value, and then a sum of weighed results is taken as the actual passing period of the specified urban road, and the like, which is not specially limited in embodiments.

Alternatively, in a possible implementation of embodiments, in block 103, in detail, a ratio of the weighed road length to the actual passing period is taken as the running speed of the specified urban road.

Alternatively, in a possible implementation of embodiments, after block 103, a smooth speed of the specified urban road may further be obtained, and then a traffic index of the specified urban road is obtained according to the smooth speed of the specified urban road and the running speed of the specified urban road. For example, a ratio of the smooth speed of the specified urban road to the running speed of the specified urban road may be taken as the traffic index such as a congestion index, or the ratio of the running speed of the specified urban road to the smooth speed of the specified urban road may further be taken as the traffic index such as the smooth index, which is not specially limited in embodiments.

In the implementation, a method may be employed as follows in detail, to obtain the smooth speed of the specified urban road. In detail, the weighed road length of the specified urban road is obtained according to the user track data of the specified urban road and the road network data of the specified urban road, then a minimum passing period of the specified urban road is obtained according to the road network data of the specified urban road and the road condition data of the specified urban road, and the smooth speed of the specified urban road is obtained according to the weighed road length of the specified urban road and the minimum passing period of the specified urban road.

A principle of obtaining the smooth speed of the specified urban road is similar to a principle of obtaining the running speed of the specified urban road in blocks 101-103. The difference is that, when a vehicle speed of each link is selected, a minimum value between a maximum value of the vehicle speed and a road limit speed in a calculation time window is taken as the vehicle speed of the link, that is, a maximum vehicle speed of the road.

In this way, by employing a correlation between the smooth speed of the specified urban road and the running speed of the specified urban road, the passing index of the specified urban road is obtained as the evaluation parameter of the specified urban road, but the running speed or the related levels of the running speed is not employed as the evaluation parameter of the urban road. Therefore, there is no need to consider the influence of differences among cities with different road development levels on operation of the urban road, enabling to effectively improve the reliability for evaluating the urban road.

In embodiments, by obtaining the weighed road length of the specified urban road according to the user track data of the specified urban road and the road network data of the specified urban road, and obtaining the actual passing period of the specified urban road according to the road network data of the specified urban road and the road condition data of the specified urban road, the running speed of the specified urban road is obtained according to the weighed road length of the specified urban road and the actual passing period of the specified urban road. A weighted average speed of the specified urban road is obtained by employing the existing user track data, the existing road network data and the existing road condition data, to present the running speed, and there is no need to deploy any hardware device, which may avoid a technical problem that a monitor result may not completely reflect the running condition of the whole urban road due to high cost of deploying the hardware device in the related art, and improve the reliability for monitoring the urban road.

In addition, with employing the technical solutions provided by the present disclosure, since large positioning data such as the user track data and the road condition data is employed, the result obtained is more accurate, which may further provide the reliability for monitoring the urban road.

In addition, with employing the technical solutions provided by the present disclosure, a correlation between the smooth speed of the specified urban road and the running speed of the specified urban road is employed, to obtain the passing index of the specified urban road as an evaluation parameter of the urban road, but the running speed or the related levels of the running speed is not employed as the evaluation parameter of the urban road. Therefore, there is no need to consider the influence of differences among cities with different road development levels on operation of the urban road, enabling to effectively improve the reliability for evaluating the urban road.

In addition, with employing the technical solutions provided by the present disclosure, user's experience may be effectively improved.

It should be noted that, for respective method embodiment above, in order to describe briefly, embodiments are expressed as a series of action combinations. However, the skilled in the art should know that, the present disclosure is not limited by the action order described, as some steps may employ other order or may be performed at the same time according to the present disclosure. Secondly, the skilled in the art may further know that, all the embodiments described in the specification belongs to preferred embodiments, and the actions and modules involved are not necessarily required by the present disclosure.

In the above embodiments, description for respective embodiment has its own emphasis. Part of embodiment not described in detail may see related description of other embodiments.

Figure 2:
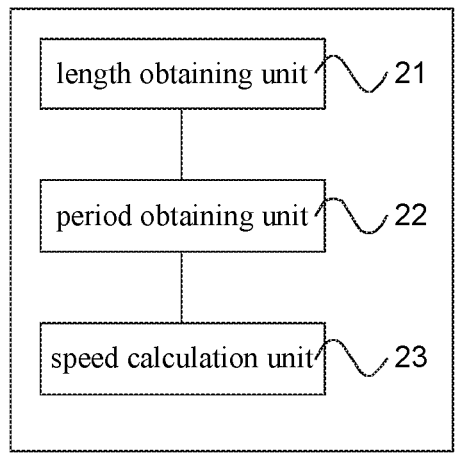
FIG. 2 is a block diagram illustrating an apparatus for processing a running speed of an urban road provided in an embodiment of the present disclosure.

FIG. 2 is a block diagram illustrating an apparatus for processing a running speed of an urban road provided in an embodiment of the present disclosure. As illustrated in FIG. 2, the apparatus for processing the running speed of the urban road may include a length obtaining unit 21, a period obtaining unit 22 and a speed calculation unit 23. The length obtaining unit 21 is configured to obtain a weighed road length of a specified urban road according to user track data of the specified urban road and road network data of the specified urban road; the period obtaining unit 22 is configured to obtain an actual passing period of the specified urban road according to the road network data of the specified urban road and road condition data of the specified urban road; and the speed calculation unit 23 is configured to obtain a running speed of the specified urban road according to the weighed road length and the actual passing period.

It should be noted that, the apparatus for processing the running speed of the urban road provided in embodiments may be an application located in a native terminal, or may further be a function unit such as a plugin or a software development kit (SDK) provided in the application of the native terminal, or may further be a processing engine located in a network side server, or may further be a distributed system located in a network side, which is not specially limited in embodiments.

It should be understood that, the application may be a native App (application) installed in the terminal, or may further be a web App of a browser in the terminal, which is not limited in embodiments.

Alternatively, in a possible implementation of embodiments, the length obtaining unit 21 may be specifically configured to: obtain an amount of driving tracks of each link in the specified urban road according to the user track data of the specified urban road; obtain a link length of each link and a number of lanes of each link according to the road network data of the specified urban road; obtain a link area of each link according to the link length of each link, the number of lanes of each link and a lane width of each road; obtain a weighed road length of each link according to the amount of driving tracks of each link and the link area of each link; and obtain the weighed road length of the specified urban road according to the weighed road length of each link.

Alternatively, in a possible implementation of embodiments, the period obtaining unit 22 may be specifically configured to: obtain a link length of each link in the specified urban road according to the road network data of the specified urban road; obtain an actual vehicle speed of each link in the specified urban road according to the road condition data of the specified urban road; obtain a link passing period of each link according to the link length of each link and the actual vehicle speed of each link; and obtain the actual passing period of the specified urban road according to the link passing period of each link.

Alternatively, in a possible implementation of embodiments, the speed calculation unit 23 may further be configured to: obtain a smooth speed of the specified urban road; and obtain a traffic index of the specified urban road according to the smooth speed of the specified urban road and the running speed of the specified urban road.

In detail, the speed calculation unit 23 is specifically configured to: obtain the weighed road length of the specified urban road according to the user track data of the specified urban road and the road network data of the specified urban road; obtain a minimum passing period of the specified urban road according to the road network data of the specified urban road and the road condition data of the specified urban road; and obtain the smooth speed of the specified urban road according to the weighed road length of the specified urban road and the minimum passing period of the specified urban road.

It should be noted that, the method in embodiments corresponding to FIG. 1 may be implemented by the apparatus for processing the running speed of the urban road provided by embodiments. Detailed description may refer to related content in embodiments corresponding to FIG. 1, which is not elaborated here.

In embodiments, the length obtaining unit is configured to obtain the weighed road length of the specified urban road according to the user track data of the specified urban road and the road network data of the specified urban road, and the period obtaining unit is configured to obtain the actual passing period of the specified urban road according to the road network data of the specified urban road and road condition data of the specified urban road, such that the speed calculation unit may be configured to obtain the running speed of the specified urban road according to the weighed road length and the actual passing period. A weighted average speed of the specified urban road is obtained by employing the existing user track data, the existing road network data and the existing road condition data, to present the running speed, and there is no need to deploy any hardware device, which may avoid a technical problem that a monitor result may not completely reflect the running condition of the whole urban road due to high cost of deploying the hardware device in the related art, and improve the reliability for monitoring the urban road.

In addition, with employing the technical solutions provided by the present disclosure, since large positioning data such as the user track data and the road condition data is employed, the result obtained is more accurate, which may further provide the reliability for monitoring the urban road.

In addition, with employing the technical solutions provided by the present disclosure, a correlation between the smooth speed of the specified urban road and the running speed of the specified urban road is employed, to obtain the passing index of the specified urban road as an evaluation parameter of the urban road, but the running speed or the related levels of the running speed is not employed as the evaluation parameter of the urban road. Therefore, there is no need to consider the influence of differences among cities with different road development levels on operation of the urban road, enabling to effectively improve the reliability for evaluating the urban road.

In addition, with employing the technical solutions provided by the present disclosure, user's experience may be effectively improved.

The above method and the above apparatus provided in embodiments of the present disclosure may be embodied by computer programs provided and operated in a device. The device may include one or more processors, and may further include a memory and one or more programs. The one or more programs are stored in the memory, which is executed by the one or more processors to implement the method flow and/or the apparatus operation illustrated in the above embodiments of the present disclosure. For example, the method flow executed by the above one or more processors may include:

obtaining a weighed road length of a specified urban road according to user track data of the specified urban road and road network data of the specified urban road;

obtaining an actual passing period of the specified urban road according to the road network data of the specified urban road and road condition data of the specified urban road; and obtaining a running speed of the specified urban road according to the weighed road length of the specified urban road and the actual passing period of the specified urban road.

The skilled in the art may clearly know that, in order to describe conveniently and briefly, detailed operation procedure of the system, the apparatus and the units described above may refer to the corresponding procedure in the method of above embodiments, which is not elaborated here.

In some embodiments provided in the present disclosure, it should be understood that, the system, the apparatus and the method disclosed may be implemented by other ways. For example, the apparatus of embodiments described above is merely exemplary. For example, the division of the units is only a logical function division, and the actual implementation may have another division way, for example, a plurality of units or webpage components may be combined or integrated in another system, or some features may be ignored, or not executed. In another way, a mutual coupling or a direct coupling or a communication connection shown or discussed may be an indirect coupling or a communication connection through some interfaces, devices or units, and may be electrical, mechanical or other forms.

The unit illustrated as a separated component may be or may not be physically separate. Components displayed as the unit may be or may not further be a physical unit, that is, may be located in a place, or may further be distributed in a plurality of network units. Part or all of units may be chosen based on an actual need to implement the objectives of the solutions of embodiments.

In addition, respective function unit in respective embodiment of the present disclosure may integrated in a processing unit, and may further be that each unit physically exists separately, and may further be that two or more units are integrated in a unit. The unit integrated above may be implemented in the form of hardware or may be implemented in the form of hardware plus software functional units.

The integrated unit implemented in form of a software function unit above may store in a computer readable storage medium. The above software function unit is stored in a storage medium, and includes certain number of instructions, such that a computer device (a personal computer, a server, or a network device) or a processor executes part of steps of method described by respective embodiment of the present disclosure. The above storage medium includes: a U disk (USB flash disk), a mobile hard disk, a read-only memory (ROM), a random access memory (RAM), a magnetic disk, or an optical disk, and the like, which may store program codes.

Finally, it should be noted that, the above embodiments are merely for illustrating the technical solutions of the present disclosure, and do not limit the technical solutions. Although detailed illustration is made to the present disclosure with reference to the above embodiments, the skilled in the art should be understood that: the technical solutions recited by the above respective embodiment may further be performed modification, or part of technical features in above respective embodiment may be performed equivalent replacement. Such modification or replacement does not cause the essence of the corresponding technical solutions to depart from the spirit and scope of the technical solutions of respective embodiments of the present disclosure.

What is claimed is:

1. A computer-implemented method for providing a running speed of an urban road, applied for digital map products and comprising:

obtaining, at one or more computing devices, a weighed road length of a specified urban road according to user track data of the specified urban road and road network data of the specified urban road, comprising: obtaining, at the one or more computing devices, an amount of driving tracks of each link in the specified urban road according to the user track data of the specified urban road; obtaining, at the one or more computing devices, a link length of each link and a number of lanes of each link according to the road network data of the specified urban road; obtaining, at the one or more computing devices, a link area of each link according to the link length of each link, the number of lanes of each link and a lane width of each link; obtaining, at the one or more computing devices, a weighed road length of each link according to the amount of driving tracks of each link and the link area of each link; and obtaining, at the one or more computing devices, the weighed road length of the specified urban road according to the weighed road length of each link;

obtaining, at the one or more computing devices, an actual passing period of the specified urban road according to the road network data of the specified urban road and road condition data of the specified urban road;

obtaining, at the one or more computing devices, a running speed of the specified urban road according to the weighed road length of the specified urban road and the actual passing period of the specified urban road; and providing, at the one or more computing devices, the running speed of the specified urban road on the digital map products.

2. The method of claim 1, wherein, obtaining the actual passing period of the specified urban road according to the road network data of the specified urban road and the road condition data of the specified urban road, comprises:

obtaining, at the one or more computing devices, a link length of each link in the specified urban road according to the road network data of the specified urban road;

obtaining, at the one or more computing devices, an actual vehicle speed of each link in the specified urban road according to the road condition data of the specified urban road;

obtaining, at the one or more computing devices, a link passing period of each link according to the link length of each link and the actual vehicle speed of each link; and obtaining, at the one or more computing devices, the actual passing period of the specified urban road according to the link passing period of each link.

3. The method of claim 1, further comprising:

obtaining, at the one or more computing devices, a smooth speed of the specified urban road; and obtaining, at the one or more computing devices, a traffic index of the specified urban road according to the smooth speed of the specified urban road and the running speed of the specified urban road.

4. The method of claim 3, wherein, obtaining the smooth speed of the specified urban road comprises:

obtaining, at the one or more computing devices, a minimum passing period of the specified urban road according to the road network data of the specified urban road and the road condition data of the specified urban road; and obtaining, at the one or more computing devices, the smooth speed of the specified urban road according to the weighed road length of the specified urban road and the minimum passing period of the specified urban road.

5. A device, comprising:
one or more processors;
a memory;
one or more programs, stored in the memory, when being executed by the one or more processors, configured to perform the following operations:
obtaining a weighed road length of a specified urban road according to user track data of the specified urban road and road network data of the specified urban road, comprising: obtaining an amount of driving tracks of each link in the specified urban road according to the user track data of the specified urban road; obtaining a link length of each link and a number of lanes of each link according to the road network data of the specified urban road; obtaining a link area of each link according to the link length of each link, the number of lanes of each link and a lane width of each link; obtaining a weighed road length of each link according to the amount of driving tracks of each link and the link area of each link; and obtaining the weighed road length of the specified urban road according to the weighed road length of each link;

obtaining an actual passing period of the specified urban road according to the road network data of the specified urban road and road condition data of the specified urban road;

obtaining a running speed of the specified urban road according to the weighed road length of the specified urban road and the actual passing period of the specified urban road; and providing the running speed of the specified urban road on digital map products.

6. A non-volatile computer readable storage medium having stored one or more programs thereon, wherein, when the one or more programs are executed by a device, the device performs the following operations:

obtaining a weighed road length of a specified urban road according to user track data of the specified urban road and road network data of the specified urban road, comprising:

obtaining an amount of driving tracks of each link in the specified urban road according to the user track data of the specified urban road; obtaining a link length of each link and a number of lanes of each link according to the road network data of the specified urban road; obtaining a link area of each link according to the link length of each link, the number of lanes of each link and a lane width of each link; obtaining a weighed road length of each link according to the amount of driving tracks of each link and the link area of each link; and obtaining the weighed road length of the specified urban road according to the weighed road length of each link;

obtaining an actual passing period of the specified urban road according to the road network data of the specified urban road and road condition data of the specified urban road;

obtaining a running speed of the specified urban road according to the weighed road length of the specified urban road and the actual passing period of the specified urban road; and providing the running speed of the specified urban road on digital map products.

7. The device of claim 5, wherein, obtaining the actual passing period of the specified urban road according to the road network data of the specified urban road and the road condition data of the specified urban road, comprises:

obtaining a link length of each link in the specified urban road according to the road network data of the specified urban road;

obtaining an actual vehicle speed of each link in the specified urban road according to the road condition data of the specified urban road;

obtaining a link passing period of each link according to the link length of each link and the actual vehicle speed of each link; and obtaining the actual passing period of the specified urban road according to the link passing period of each link.

8. The device of claim 5, wherein the operations further comprise:

obtaining a smooth speed of the specified urban road; and obtaining a traffic index of the specified urban road according to the smooth speed of the specified urban road and the running speed of the specified urban road.

9. The device of claim 8, wherein, obtaining the smooth speed of the specified urban road comprises:
obtaining a minimum passing period of the specified urban road according to the road network data of the specified urban road and the road condition data of the specified urban road; and
obtaining the smooth speed of the specified urban road according to the weighed road length of the specified urban road and the minimum passing period of the specified urban road.

10. The non-volatile computer readable storage medium of claim 6, wherein, obtaining the actual passing period of the specified urban road according to the road network data of the specified urban road and the road condition data of the specified urban road, comprises:
obtaining a link length of each link in the specified urban road according to the road network data of the specified urban road;
obtaining an actual vehicle speed of each link in the specified urban road according to the road condition data of the specified urban road;
obtaining a link passing period of each link according to the link length of each link and the actual vehicle speed of each link; and
obtaining the actual passing period of the specified urban road according to the link passing period of each link.

11. The non-volatile computer readable storage medium of claim 6, wherein the operations further comprise:
obtaining a smooth speed of the specified urban road; and
obtaining a traffic index of the specified urban road according to the smooth speed of the specified urban road and the running speed of the specified urban road.

12. The non-volatile computer readable storage medium of claim 11, wherein, obtaining the smooth speed of the specified urban road comprises:
obtaining a minimum passing period of the specified urban road according to the road network data of the specified urban road and the road condition data of the specified urban road; and
obtaining the smooth speed of the specified urban road according to the weighed road length of the specified urban road and the minimum passing period of the specified urban road.

13. The method of claim 1, wherein the driving track is a set including a plurality of track points.

14. The device of claim 5, wherein the driving track is a set including a plurality of track points.

15. The storage medium of claim 6, wherein the driving track is a set including a plurality of track points.

* * * * *